United States Patent Office 3,658,927
Patented Apr. 25, 1972

3,658,927
OLEFIN CONVERSION AND CATALYSTS THEREFOR
Donald L. Crain and Robert E. Reusser, Bartlesville, Okla., assignors to Phillips Petroleum Company
No Drawing. Continuation of application Ser. No. 627,634, Apr. 3, 1967. This application Sept. 2, 1969, Ser. No. 856,886
Int. Cl. C07c 3/62
U.S. Cl. 260—666 A                    20 Claims

ABSTRACT OF THE DISCLOSURE

Olefins are converted into other olefins having different numbers of carbon atoms by contact with a catalyst, active for disproportionating propylene into ethylene and butene, comprising alumina promoted with a compound of molybdenum, tungsten or rhenium and further treated with a modifying amount of a compound of an alkali metal or an alkaline earth metal.

This application is a continuation of application Ser. No. 627,634, filed Apr. 3, 1967, now abandoned.

This invention relates to the conversion of olefin hydrocarbons and to a catalyst for such conversion. In one aspect this invention relates to the olefin reaction. In another aspect it relates to the conversion of olefins to other olefins having different molecular weights by contact with an olefin reaction catalyst, active for disproportionating propylene into ethylene and butene, comprising alumina promoted with a compound of molybdenum, tungsten, or rhenium and further treated with a modifying amount of a compound of an alkali metal or an alkaline earth metal.

The term olefin reaction, as used herein, is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by at least the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

According to the invention the isomerization and/or polymerization reactions which accompany the olefin reaction are substantially eliminated or at least greatly reduced.

It is an object of this invention to provide a method for the conversion of olefins. Another object of this invention is to provide a catalyst for the conversion of olefins. Still another object of this invention is to provide a method for converting olefins to similar olefins of higher and lower numbers of carbon atoms. Still another object is to provide a method for improving the selectivity of a molybdenum, tungsten, or rhenium promoted alumina catalyst for the conversion of olefins into similar olefins of higher and lower numbers of carbon atoms. Still another object is to provide a method for quenching the propensity of such a promoted alumina olefin reaction catalyst for polymerizing or isomerizing an olefin which is contacted with such a catalyst. The provision of a method for selectively modifying acid sites on a molybdenum, tungsten or rhenium promoted alumina catalyst is still another object of this invention. Other aspects, objects and advantages of our invention will be apparent to one skilled in the art upon reading the disclosure including a detailed description of the invention.

According to the process of this invention, olefins are converted by the olefin reaction under appropriate reaction conditions, including conditions of temperature and residence time to produce products of the olefin reaction, with a catalyst consisting essentially of alumina promoted by treatment with an oxide or compound convertible to an oxide by calcination of molybdenum, tungsten, or rhenium; a sulfide or hexacarbonyl of tungsten or molybdenum; or an alkali metal salt, ammonium salt, alkaline earth metal salt or bismuth salt of phosphomolybdic acid; and further treated with a modifying amount of a compound of an alkali metal or an alkaline earth metal. The alkali metal or alkaline earth metal is preferably added prior to calcination of the catalyst and more preferably after the promoter is added to the catalyst; although, except as later noted, the alkali or alkaline earth metal can be added at any time during preparation of the catalyst of the invention.

The alkali metal or alkaline earth metal compounds which can be utilized in the process of the invention are those which will deposit the metal or a metal compound upon the catalyst which are inorganic bases or which form inorganic bases upon calcination. Suitable metal compounds include the oxides, hydroxides, carbonates, bicarbonates, sulfates, halides, nitrates, acetates, and the like of lithium, sodium, potassium, rubidium, cesium, calcium, strontium or barium. Sodium hydroxide, potassium hydroxide, sodium carbonate, potassium chloride, barium hydroxide and cesium hydroxide are representative of the applicable compounds useful in the practice of the invention.

The amount of alkali metal compound or alkaline earth metal compound added to the tungsten-, molybdenum- or rhenium-promoted catalyst according to this invention can be in the range of about 0.005 to 5 weight percent based on the weight of the catalyst. For reasons of efficiency or economy about 0.01 to 3 weight percent will often be utilized and particularly satisfying results are often obtained with 0.05 to 1 weight percent.

The catalyst used in the invention comprises an oxide of aluminum. Any conventional catalytic grade of alumina including the eta or gamma forms can be used. When the promoter is molybdenum oxide, the catalyst is frequently additionally promoted by an oxide of cobalt. The catalysts of my invention can contain other materials which do not substantially promote undesirable side reactions. For example, the alumina base can contain silica, magnesia, titania, or other bases in amounts which do not change the essential characteristics of the reaction. For example, small amounts of silica or magnesia can be used to make the base more resistant to surface area reduction by contact with moisture. When silica is present, proportions of silica and alumina for which the support itself has appreciable activity for cracking or polymerization should be avoided. Suitable supports include 100 percent alumina, silica-alumina wherein the amount of silica is up to about 25 percent, of the total support; magnesia-alumina wherein the amount of magnesia is up to about 20 percent of the total support, and titania-alumina wherein the amount of titania is up to about 85 percent of the total support.

When alkali or alkaline earh metals or metal compounds are present in the support materials as impurities, such materials are usually well dispersed in the support material and, therefore, the amount available on the surface is very small and does not exhibit the modifying effect of the invention even when the impurity is present in an appreciable amount. It is presently believed that the alkali or alkaline earth metal modifies the acid sites of the catalyst and tests have shown that the catalyst is more effective in depressing the polymerization reaction when the alkali or alkaline earth metal is added to the catalyst after the promoter is added to the support. Beneficial results of the invention are, however, obtained when the alkali or alkaline earth metal is added to the support prior to adding the promoter. The above is true whether or not an alkali or alkaline earth metal or metal compound is originally present in the support as an impurity.

Because it is generally the major portion of the catalyst, the alumina is, for convenience, referred to as the catalyst support. Similarly, the molybdenum, tungsten, and rhenium compounds are referred to as promoters. It should be understood, however, that the catalytic agent is the reaction product resulting from the admixture of alumina and at least one suitable promoter material under activating conditions.

The composite catalyst can be prepared by any conventional method such as dry mixing, coprecipitation or impregnation. For example, a 10–100 mesh alumina (having a 178 m.²/g. surface area and a 107 A. pore diameter) is impregnated with an aqueous solution of a molybdenum compound, such as ammonium molybdate, which is convertible to the oxide upon calcination. A commercially available catalyst comprising 12.8:3.8:83.4

$MoO_3$—$CoO$—$Al_2O_3$ having a 208 m.²/g. surface and a 96 A. pore diameter is also satisfactory. Commercial molybdena or cobalt-molybdate on alumina catalysts, which catalysts generally contain between 8 and 15 percent by weight of the promoter, are satisfactory. Except for the steps required to include the alkali or alkaline earth metal compounds, the catalyst compositions are prepared by methods ordinarily used in the art.

Sufficient promoter is used to obtain the desired activity. Since the molybdenum, tungsten and rhenium compounds usually are more expensive than the support material, unnecessarily large amounts are ordinarily not used. Generally the finished catalyst base contains from 0.1 percent to 30 percent by weight of the selected promoter. However, larger amounts can be used. In most instances, a preferred amount of the promoter is from 1 percent to 20 percent. Cobalt oxide can be present in the molybdenum promoted catalyst in the range of 0 to about 20 weight percent of the total catalyst, preferably about 1 to 5 percent when present.

The alkali or alkaline earth metal compounds can be incorporated into the catalyst composition by several methods depending upon the specific promoter compounds utilized in the catalyst. When using oxides, or compounds convertible to the oxides on calcination of tungsten, molybdenum, or rhenium, or when using salts of phosphomolybdic acid as the promoter compounds, the alkali or alkaline earth compounds are added to the alumina support either before, during, or after incorporation of the promoter compound using such conventional methods as dry mixing or impregnation. After the alkali or alkaline earth metal compound is incorporated into the alumina support, either in the presence or absence of the promoter material, the alumina composite is then heat treated, in a procedure which is identical with the activation heat treatment of the finished catalyst. Thus, if the promoter material and catalyst modifier are present, the heat treatment will prepare the catalyst for immediate use in the hydrocarbon conversion process.

Before use in the olefin reaction, the above-described oxide-promoted or phosphomolybdate-promoted catalysts are activated by a heat treatment. The catalysts are subjected to 700–1600° F., preferably 900–1400° F. for 0.5–20 hours or longer. Generally the longer activation periods are used with lower temperature and shorter activation periods with higher temperatures. At temperatures of about 1100° F. and lower, long activation times, e.g., 50 hours or more are not harmful to activity. It is preferred that the catalyst treatment be carried out in an atmosphere of flowing, non-reducing gas. Activation in the presence of an atmosphere of a free oxygen-containing gas, e.g., air, is preftrred, but less active but effective catalysts for the olefin reaction can be obtained by activation with an inert gas. Suitable gases for such an activation treatment include nitrogen, gas from an inert atmosphere generator (a conventional refinery apparatus in which natural gas or other combustible hydrocarbon gas is burned with a stoichiometric quantity of air, yielding an essentially non-reducing gas mixture), substantially non-reducing flue gases, carbon dioxide, helium, argon, krypton, neon, xenon, and radon. The presence of reducing gases during activation should be avoided.

Significant amounts of moisture in the activation gas, especially at higher temperatures, are harmful to the catalyst by reducing the surface area.

When the hexacarbonyls or sulfides of tungsten or molybdenum are used as the promoter materials, the alkali or alkaline earth metal compounds are added to the support before the promoter materials are incorporated. Thus, the alumina is dry mixed or impregnated with the alkali or alkaline earth metal compound. It is then given the above-described heat treatment. The catalyst preparation is then continued by incorporating the hexacarbonyl or sulfide promoter compounds such as, for example, ball-milling the alumina composite with tungsten, sulfide, or by impregnating the silica composite with a non-aqueous solution, such as a benzene, solution of molybdenum hexacarbonyl. The catalyst preparation is then completed by heat treating these composites in the absence of air. Hexacarbonyl-promoted catalysts can be heated for several seconds up to 18 hours at 58–700° F. in a vacuum. Sulfide-promoted catalysts can be heated for 0.5–20 hours at 800–1400° F. in the presence of nitrogen, hydrogen, carbon monoxide, noble gases, or mixtures of these.

In the practice of the hydrocarbon conversion process of this invention, the catalyst can be used, without regeneration, for runs up to 80 hours or more, and can be regenerated repeatedly without serious damage. The regeneration can be accomplished by procedures similar to the original activation. For example, oxide-promoted catalysts can be regenerated by contact with diluted air, to remove accumulated coke. We have found that the presence of steam can be tolerated when activating or regenerating the catalysts of our invention. This is particularly true when a more stable catalyst base, e.g., alumina with a small amount of silica or magnesia, is used.

Olefins applicable for use in the process of the invention are acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2,7,7-diethyl-1,3,5-decatriene, 1,3,5,7,9-octadecapentaene, 1,3-eicosadiene, 4-octene, 3-cicosene and 3-heptene, and the like and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5 - n - propylcyclooctene, cyclodecene, cyclododecene, 3,3,5,5-tetramethylcyclononene, 3,4,5,6,7 - pentaethylcyclodecene, 1,5 - cyclooctadiene, 1,5,9-cyclododecatriene, 1,4,7,10 - cyclododecatetraene, 2-methyl-6-ethylcyclooctadiene-1,4, and the like and mixtures thereof.

The process of this invention can be carried out either batchwise or continuously, using a fixed catalyst bed, or a stirrer equipped reactor or other mobile catalyst contacting process as well as any other well-known contacting techniques. Preferred reaction conditions, e.g., temperature, pressure, flow rates, etc., vary somewhat depending upon the specific catalyst composition, the particular feed olefin, desired products, etc. The process is carried out at about 150–500° F., preferably 250–400° F., at pressures in the range of 0–1500 p.s.i.g. Although the olefin reactions of this invention are essentially independent of pressure, for most economical operation, considering combination with other steps of a complete plant operation including, for example, product separation and recovery, a pressure range of 200–600 p.s.i.g. can be used conveniently.

The operable range of contact time for the process of this invention depends primarily upon the operating temperature and the activity of the catalyst, which is influenced by surface area, promoter concentration, amount of the alkali metal or alkaline earth metal used in the treating step, activation temperature, etc. In general, the distribution of products is not drastically altered by variation in contact time. However, long contact times favor the production of larger proportions of higher molecular weight products. In general, shorter contact times are associated with higher temperatures, but, when larger amounts of higher molecular weight products are desired a suitable combination of contact time and temperature is selected.

With proper selection of conditions and contact times, very high efficiency of conversion to desired products can be obtained. Near equilibrium conversion of propylene, about 40 percent, can be obtained, with efficiency of conversion to ethylene and butenes consistently above 95 percent. However, commercial operation as low as 85 percent efficiency or lower can be carried out economically.

With a fixed bed reactor and continuous flow operation at weight hourly space velocities in the range of 0.5 to 1000 parts by weight of hydrocarbon feed per part by weight of catalyst per hour are suitable, with excellent results having been obtained in the range of 1 to 200. With a propylene feed, high conversion and efficiency in commercial operation can be obtained in the range of 3 to 10. The space velocity is adjusted according to changes in density of feed due to change of pressure or temperature, and variation in reaction temperature and the activity of the catalyst. The higher space velocities in general are associated with higher reaction temperatures. In general, contact times in the range of 0.5 second to 10 hours are used. For gas phase operation, contact times of 1 to 200 seconds generally are used with excellent results being obtained in the range of 5 to 100 seconds. For liquid phase operation contact times of 1 minute to 4 hours are preferred. Longer contact time, for example, in the range of 6–24 hours, especially in batch-type reaction, can be used where it is desired to increase the ratio of higher molecular weight materials to lower molecular weight materials.

The olefin reaction can be carried out either in the presence or absence of a diluent. Diluents selected from the group consisting of paraffinic and cycloparaffinic hydrocarbons can be employed. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule. The diluent should be nonreactive under the conditions of the olefin reaction.

When olefin mixtures are charged, the mole ratio of olefins can vary over a wide range. For example, when two olefins (A and B) are charged, the mole ratio of $A/B$ can vary over a range of from 1/20 to 20/1 or even higher, and lower if desired.

The following specific examples are intended to illustrate the advantages of the process of this invention, but it is not intended that it be limited to the specific features shown in these examples.

EXAMPLE I

A series of runs was carried out in which octene-2 and ethylene were reacted together according to the process of this invention. In these runs, a mixture of ethylene and octene-2 was passed over a bed of cobalt molybdate on alumina catalyst. In one run, the catalyst was not treated with potassium hydroxide while in the other three runs, KOH was added to the catalyst in an amount of 2 weight percent, 1 weight percent, and 0.52 weight percent based on the catalyst.

The catalyst used in these runs was prepared by impregnating alumina with cobalt molybdate and thereafter activating the catalyst by heating to 1000° F. for 5 hours in air. The catalyst contained 3.42 weight percent CoO, 11.0 weight percent $MoO_3$, and 85.6 weight percent $Al_2O_3$. This catalyst had a surface area of 284 $m.^2/g$. In the three runs employing KOH-treated catalyst, the catalyst which was impregnated was treated with base by weighing out 100 grams of the catalyst, adding 75 ml. water plus the desired amount of KOH and allowing it to stand overnight. The excessive water was then evaporated off and the catalyst was activated at 1000° F. for 5 hours. The octene-2 used in these runs contained 58.3 weight percent cis-octene-2, 41.5 weight percent trans-octene-2, 0.2 weight percent cis-octene-3 and a trace of trans-octene-3.

The runs were carried out by passing a stream of octene-2 from a Lapp pump and a stream of ethylene from a cylinder, both streams of which had been dried over calcium hydride separately to the top of a vertical reactor and allowing the streams to mix prior to entering a glass-bead filled section above a 6" deep by 13/16" diameter bed of the catalyst. Each of these runs was made employing 35.2 grams (50 ml.) of octene-2, and each run was carried out at 140° C. and 800 p.s.i. The temperature was maintained at 140° C. by means of a reactor jacket containing refluxing mixed xylenes. The measured temperature in the glass-bead section above the catalyst was 235° F. 113° C. in the reactor bed itself it was 288° F. (140° C.), and the bottom glass-bead section below the catalyst bed was 140° C.

The results of these runs are expressed below as Table I. It can be seen that the selectively to the expected major product, heptene-1, was greatly improved by the addition of KOH to the catalyst. Run 2, wherein 2 percent of KOH was added, shows that the conversion is decreased to a very low figure by larger amounts of base. Runs 3 and 4 show that lesser amounts of base do not drastically effect conversion, but markedly improve the selectivity to heptenes.

TABLE I

| Run number | 1 | 2 | 3 | 4 |
|---|---|---|---|---|
| Wt. percent KOH | 0 | 2 | 1 | 0.5 |
| Temp., ° C./pressure, p.s.i. | 140/800 | 140/800 | 140/800 | 140/800 |
| Mol ratio ethylene/octene-1 | 12.2 | 11.47 | 13.19 | 13.46 |
| LHSV [1] | 3.60 | 3.85 | 3.36 | 3.27 |
| Percent conversion | 36.69 | 4.38 | 33.49 | 42.00 |
| Product analysis (GLC), wt. percent: | | | | |
| $C_2$ | 0.00 | 0.71 | 0.00 | 0.00 |
| $C_3$ | 0.51 | 0.32 | 2.12 | 1.46 |
| $C_4$ | 2.81 | 0.08 | 0.42 | 1.09 |
| $C_5$ | 3.21 | | 0.11 | 0.71 |
| $C_6$ | 6.30 | 0.01 | 0.91 | 2.89 |
| $C_7$ | 20.25 | 3.04 | 28.17 | 32.85 |
| $C_8$ | 63.31 | 95.62 | 66.41 | 58.00 |
| $C_9$ | 1.22 | | 0.15 | 0.27 |
| $C_{10}$ | 1.03 | | Nil | 0.23 |
| $C_{11}$ | 1.12 | | 0.08 | 0.47 |
| $C_{12}$ | 1.18 | 0.19 | 1.51 | 1.69 |
| $C_{13}$ | | | Nil | 0.33 |
| Ultimate yield—$C_7$, wt. percent | 55.2 | 69.40 | 84.11 | 78.21 |
| $C_7$ as 1-heptene, wt. percent | 74.3 | 95.1 | 94.6 | 87.2 |

[1] Liquid hourly space velocity in volume liquid feed/volume catalyst/hour.

EXAMPLE II

Two runs were carried out in which octene-1 was converted to other olefins by contact with a molybdenum-containing catalyst according to the process of this invention. In the first run, Run 5, the catalyst employed was identical to that of Run 1 of Example I while in the second run, Run 6, the catalyst contained 2 weight percent KOH and is identical to the catalyst of Run 2 of Example I.

In the first run, Run 5, 36.1 grams of 1-octene was refluxed for 2 hours and 8 minutes through a 4" deep catalyst bed contained in a column mounted over a distillation pot using a pot temperature of 120–175° C., a head temperature of 92–88° C., and a column temperature of 120–130° C. The range of temperature shown indicates that the pot temperature at the beginning of the run was 120° C. and slowly increased to 175° C. The liquid product retained in the kettle amounted to 27.1 grams while the overhead material collected in a trap was 0.7 gram. The liquid kettle product was analyzed by gas-liquid chromatography (GLC).

In the second run, Run 6, the procedure of the control run was used except that the catalyst contained 2 percent by weight KOH. In this run the 1-octene was refluxed over the catalyst bed for 7 hours. During this time the head temperature slowly dropped from 118 to 112° C. and the pot temperature slowly increased from 121 to 175° C. A total of 28.9 grams of liquid product was collected. This product was analyzed by GLC and the results are expressed below as Table II. In Table II it is clearly shown that the addition of KOH to the catalyst greatly reduces the product formed and greatly increases the amount of $C_{14}$ olefins obtained from this reaction.

TABLE II

| | Mol percent ($C_8$-free) | |
|---|---|---|
| Olefin | GLC analysis Run 5 (untreated) | GLC analysis Run 6 (2% KOH) |
| $C_7$ | 0.75 | 2.46 |
| $C_8$ | | |
| $C_9$ | 16.12 | 11.96 |
| $C_{10}$ | 5.77 | 0.65 |
| $C_{11}$ | 6.14 | 0.79 |
| $C_{12}$ | 12.00 | 2.92 |
| $C_{13}$ | 22.50 | 14.95 |
| $C_{14}$ | 35.25 | 66.20 |
| $C_{16}$ [1] | 1.58 | [2] |

[1] Branched.  [2] None detected.

EXAMPLE III

One hundred grams of pelleted alumina activated in air at 1000° F′ for 2 hours was treated with a solution of 18.4 grams of ammonium molybdate in 100 ml. of water. The water was evaporated and the treated pellets were heated for 4 hours at 1000° F. in a moving current of air. This catalyst was labeled A.

Fifty grams of the molybdenum-promoted alumina pellets were treated with 19.4 ml. of 0.0515 gram (g.) per milliliter (ml.) of aqueous KOH and 40 ml. of water. This represents 2 wt. percent KOH based on the pellets. The pellets were left in the solution for 10 minutes, after which the water was decanted and the pellets activated at 1000° F., in air, for 4 hours. This catalyst was labeled B.

Fifty grams of the activated alumina pellets were added to 40 ml. of water and 19.4 ml. of 0.0515 g./ml. aqueous KOH and allowed to stand for 10 minutes. The water was decanted and the pellets were heated in air for 4 hours at 1000° F. The pellets were then poured into a solution of 9.2 grams of ammonium molybdate in 50 ml. of water. The water was evaporated and the treated catalyst was heated in air for 4 hours at 1000° F. The pellets were then poured into a solution of 9.2 grams of ammonium molybdate in 50 ml. of water. The water was evaporated and the treated catalyst was heated in air for 4 hours at 1000° F. This catalyst was labeled C.

The above catalysts, A, B, and C were then compared for activity and selectivity in the disproportionation of octene-1. In each run, 30 ml. of octene-1 was charged to a 50 ml. flask and refluxed up through a bed of the candidate catalyst until the flask temperature reached 347° F. (175° C.). The material in the flask was then analyzed by gas-liquid chromatography. The results of the runs are shown in the Table III below.

TABLE III

| Run | Catalyst | Time | Conversion, percent | $C_{14}$ olefin, mol percent of product |
|---|---|---|---|---|
| 7 | A | 57 minutes | 88.5 | 14.00 |
| 8 | B | 62 minutes | 81.4 | 64.51 |
| 9 | C | 3 hours | 80.1 | 58.94 |

The data show that KOH added to the molybdenum-promoted catalyst (Run 8) improved selectivity for $C_{14}$ olefin with very little reduction in total conversion. The addition of KOH to the alumina prior to addition of molybdenum (Run 9) also improved selectivity of the catalyst but slowed the reaction somewhat.

EXAMPLE IV

A portion of the cobalt molybdate on alumina catalyst of Example I was treated with 1.1 weight percent of potassium chloride as in Example I and compared with an untreated portion of the catalyst in the disproportionation of octene-1 according to the procedure of Examples II and III. The results of these runs are shown in Table IV:

TABLE IV

| Run No. | Weight percent KCl | Reaction time, minutes | Conversion, percent | Mol percent in product $C_{14}$ olefin | Mol percent in product $C_{16}$ olefin |
|---|---|---|---|---|---|
| 10 | 0 | 21.4 | 80.8 | 21.05 | 3.86 |
| 11 | 1.1 | 30.5 | 79.9 | 59.3 | 0.03 |

The above runs show that the addition of an alkali metal halide minimizes isomerization and polymerization by the increased yield of $C_{14}$ olefin primary product as well as by the decreased yield of $C_{16}$ olefin dimerization by-product. Conversion was not affected appreciably.

EXAMPLE V

Approximately 20 volumes of 1,7-octadiene were refluxed over 10 volumes of the catalyst of Run 3 of Example I. Conditions were as shown in Table V.

TABLE V

| Time | Temperature, ° C. Overhead | Temperature, ° C. Kettle |
|---|---|---|
| 9:25 | 95 | 118 |
| 9:40 | 86 | 118 |
| 10:25 | 82 | 114 |
| 11:10 | 82 | 167 |

A sample of the overhead product taken at 10:25 was analyzed by GLC and showed about 95 weight percent cyclohexene and small amounts of ethylene and butenes. The pot residue (kettle bottoms) was considered to be polymeric material.

The above results show that 1,7-octadiene is converted to cyclohexene and ethylene by contact with the catalyst treated according to this invenion.

That which is claimed is:

1. A composition, active as a catalyst for the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, consisting essentially of alumina promoted with a compound selected from the group consisting of oxides of tungsten, molybdenum, and rhenium, sulfides and hexacarbonyls of tungsten and molybdenum, and alkali metal, alkaline earth metal, ammonium and bismuth salts of phosphomolybdic acid, and, deposited upon said catalyst, a modifying amount in the range of 0.005 to 5 weight percent of the total catalyst of an inorganic base which is a compound of a metal selected from the group consisting of oxides, hydroxides, carbonates, bicarbonates, sulfates, halides, nitrates, and acetates of lithium, sodium, potassium, rubidium, cesium, calcium, strontium, and barium.

2. The composition of claim 1 consisting essentially of alumina promoted with an oxide of molybdenum and, deposited upon said catalyst, a modifying amount of a compound of sodium.

3. The composition of claim 1 consisting essentially of alumina promoted with an oxide of molybdenum and, deposited upon said catalyst, a modifying amount of a compound of potassium.

4. The composition of claim 3 wherein said compound of potassium is selected from the group consisting of potassium hydroxide and potassium chloride.

5. The process of converting an olefin hydrocarbon according to the olefin reaction which comprises contacting at least one olefin hydrocarbon selected from the group consisting of acyclic mono- and polyenes having 3 to 30 carbon atoms per molecule including cycloalkyl and aryl derivatives thereof, cyclic mono- and polyenes having 4 to 30 carbon atoms per molecule including alkyl and aryl derivatives thereof, mixtures thereof and mixtures with ethylene, with a catalyst active for the olefin reaction and consisting essentially of:

alumina, a promoting amount of a compound selected from the group consisting of oxides of tungsten, molybdenum and rhenium, sulfides and hexacarbonyls of tungsten and molybdenum, and ammonium salts, alkali metal salts, alkaline earth metal salts and bismuth salts of phosphomolybdic acids, and an added modifying amount deposited on the catalyst in the range of 0.005 to 5 weight percent of the total catalyst of an inorganic base which is a compound of a metal selected from the group consisting of alkali metals and alkaline earth metals, under conditions, including conditions of temperature within a temperature range of 150 to 500° F., pressure and contact time, suitable for obtaining a product of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond.

6. The process of claim 5 wherein said inorganic base is selected from the group consisting of sodium hydroxide, potassium hydroxide, sodium carbonate, potassium chloride, barium hydroxide and cesium hydroxide.

7. The process of claim 5 wherein said modifying amount of an inorganic base is added subsequent to the addition of said promoting amount of a compound.

8. The process of claim 5 wherein the compound of an alkali metal or alkaline earth metal is added to said alumina in an amount of about 0.01 to 3 weight percent of the total catalyst.

9. The process of claim 5 wherein the compound of an alkali metal or alkaline earth metal is added to said alumina in an amount of about 0.05 to 1 weight percent of the total catalyst.

10. The process of claim 6 wherein said catalyst active for the olefin reaction includes a promoting amount of molybdenum oxide.

11. The process of claim 6 wherein said catalyst active for the olefin reaction includes the promoting amount of a compound selected from the group consisting of oxides of tungsten, molybdenum, and rhenium.

12. The process of claim 10 wherein said olefin hydrocarbon is selected from the group consisting of acyclic mono- and polyenes, mixtures thereof and mixtures with ethylene.

13. The process of claim 12 wherein said olefin hydrocarbon is selected from the group consisting of octene-1, octene-2 and 1,7-octadiene.

14. The composition of claim 1 wherein said alumina is promoted with a compound selected from the group consisting of oxides of tungsten, molybdenum and rhenium.

15. The composition of claim 1 wherein said alumina is promoted with an oxide of molybdenum.

16. The composition of claim 15 also including an oxide of cobalt.

17. The proces of claim 5 wherein said inorganic base is selected from the group consisting of oxides, hydroxides, carbonates, bicarbonates, sulfates, halides, nitrates and acetates of lithium, sodium, potassium, rubidium, cesium, calcium, strontium and barium.

18. The process of claim 17 wherein said promoting amount of a compound is selected from the group consisting of oxides of tungsten, molybdenum and rhenium.

19. The process of claim 17 wherein said promoting amount of a compound is an oxide of molybdenum.

20. The process of claim 19 wherein said catalyst also includes an oxide of cobalt.

References Cited

UNITED STATES PATENTS

| | | | |
|---|---|---|---|
| 3,526,676 | 9/1970 | Turner et al. | 260—683 D |
| 3,424,812 | 11/1969 | Howman | 260—683 D |
| 3,424,811 | 1/1969 | Mango | 260—683 D |

FOREIGN PATENTS

| | | | |
|---|---|---|---|
| 1,056,980 | 2/1967 | Great Britain | 260—683 D |

DELBERT E. GANTZ, Primary Examiner

V. O'KEEFE, Assistant Examiner

U.S. Cl. X.R.

260—683 D; 252—435, 439, 467, 475, 476